(12) United States Patent
Kerry et al.

(10) Patent No.: US 7,570,862 B2
(45) Date of Patent: Aug. 4, 2009

(54) TELECOMMUNICATIONS LEAD-IN APPARATUS

(75) Inventors: John Kerry, Ipswich (GB); Philip A Barker, Ipswich (GB)

(73) Assignee: British Telecommunications plc, London (GB)

( * ) Notice: Subject to any disclaimer, the term of this patent is extended or adjusted under 35 U.S.C. 154(b) by 0 days.

(21) Appl. No.: 10/573,520

(22) PCT Filed: Sep. 30, 2004

(86) PCT No.: PCT/GB2004/004183

§ 371 (c)(1),
(2), (4) Date: Mar. 24, 2006

(87) PCT Pub. No.: WO2005/033758

PCT Pub. Date: Apr. 14, 2005

(65) Prior Publication Data

US 2007/0041696 A1 Feb. 22, 2007

(30) Foreign Application Priority Data

Sep. 30, 2003 (GB) ................................. 0322893.9

(51) Int. Cl.
G02B 6/00 (2006.01)
B65H 59/00 (2006.01)
(52) U.S. Cl. .............................. 385/136; 254/134.3 FT
(58) Field of Classification Search ......... 385/134–136, 385/53, 75, 86; 254/134.3 FT, 134.3 R
See application file for complete search history.

(56) References Cited

U.S. PATENT DOCUMENTS

| 5,503,369 | A  | * | 4/1996  | Frost et al. ........... 254/134.3 FT |
| 6,321,017 | B1 |   | 11/2001 | Janus et al. .................. 385/134 |
| 6,445,865 | B1 |   | 9/2002  | Janus et al. .................. 385/135 |
| 6,580,029 | B1 |   | 6/2003  | Bing |

FOREIGN PATENT DOCUMENTS

| DE | 37 42 448 A1 | 6/1989 |
| DE | 195 44 724 A1 | 6/1997 |

(Continued)

OTHER PUBLICATIONS

English-language translation of JP 2003248125, completed Dec. 5, 2007.*

(Continued)

*Primary Examiner*—Ellen Kim
(74) *Attorney, Agent, or Firm*—Nixon & Vanderhye PC

(57) ABSTRACT

A cable lead out device (10) suitable for use within a bore (13) through a wall (60), the device comprising a body to guide a cable, the cable having a minimum permitted bend radius, along a passageway in the bore, the passageway being defined by the body and extending in an arc from a first point within the bore via the mouth of the bore to a second point outside of the bore, wherein the first point is sited within the bore at a location so that the cable guided along the passageway arcs substantially at its minimum permitted bend radius. The device (10) consists of a tube portion (12), a neck (26) having an engaging end (24), a horn portion (14) having an arc-shaped passageway (15) and a terminating end (16). The device (10) is suitable for electrical and optical cables.

13 Claims, 18 Drawing Sheets

FOREIGN PATENT DOCUMENTS

| | | |
|---|---|---|
| DE | 299 00 087 U1 | 5/1999 |
| DE | 101 13 528 A1 | 9/2002 |
| EP | 0 677 756 A2 | 10/1995 |
| EP | 0 748 460 B1 | 11/1998 |
| GB | 2287077 A | 9/1995 |
| JP | 9-243859 | 9/1997 |
| JP | 2003-248125 | 5/2003 |
| JP | 2003-248125 | 9/2003 |

OTHER PUBLICATIONS

English-language translation of JP 09243859, completed Dec. 5, 2007.*

International Search Report mailed Feb. 4, 2005 in corresponding International Application No. PCT/GB2004/004183.

UK Search Report dated Mar. 10, 2004.

* cited by examiner

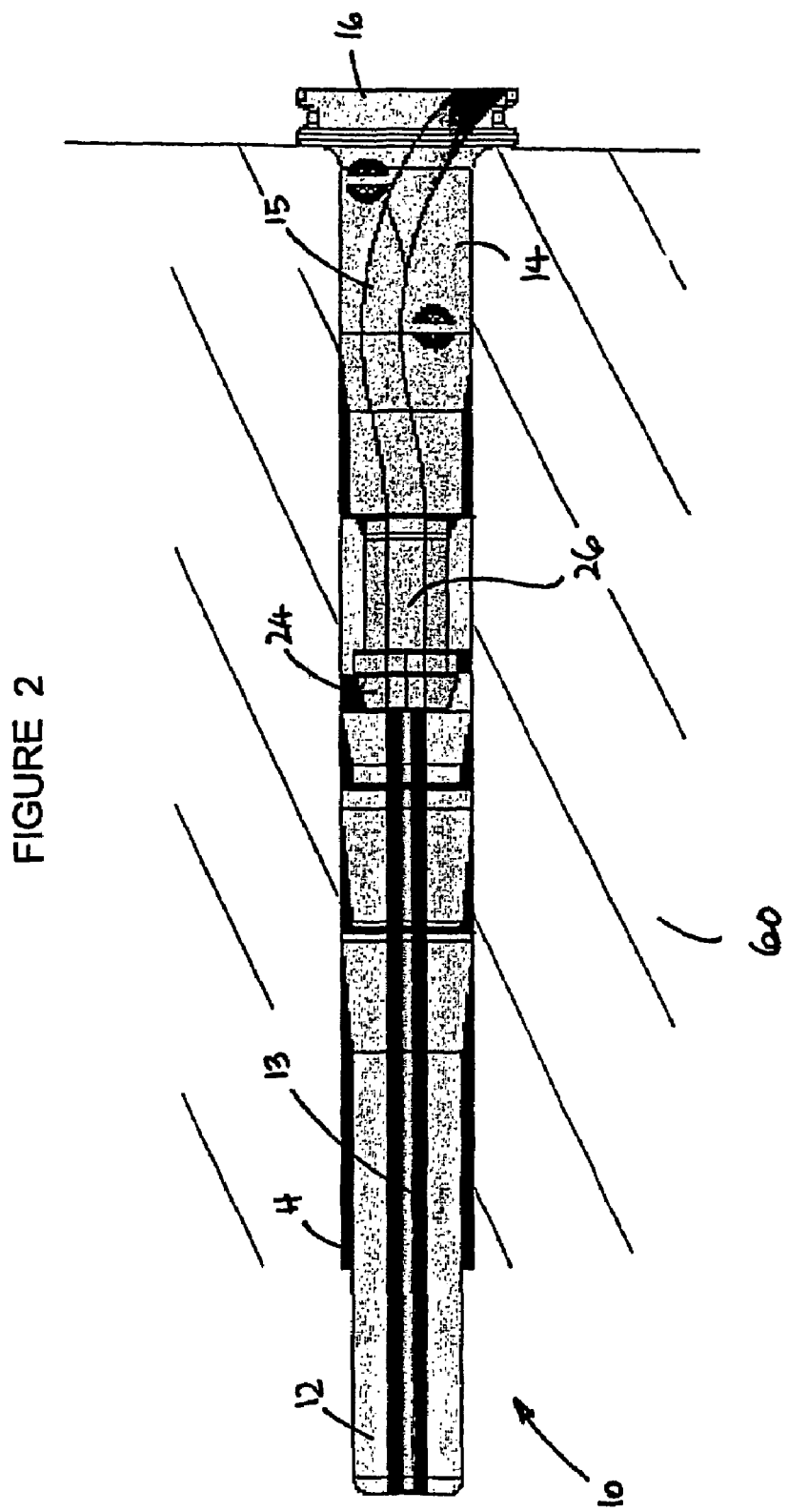

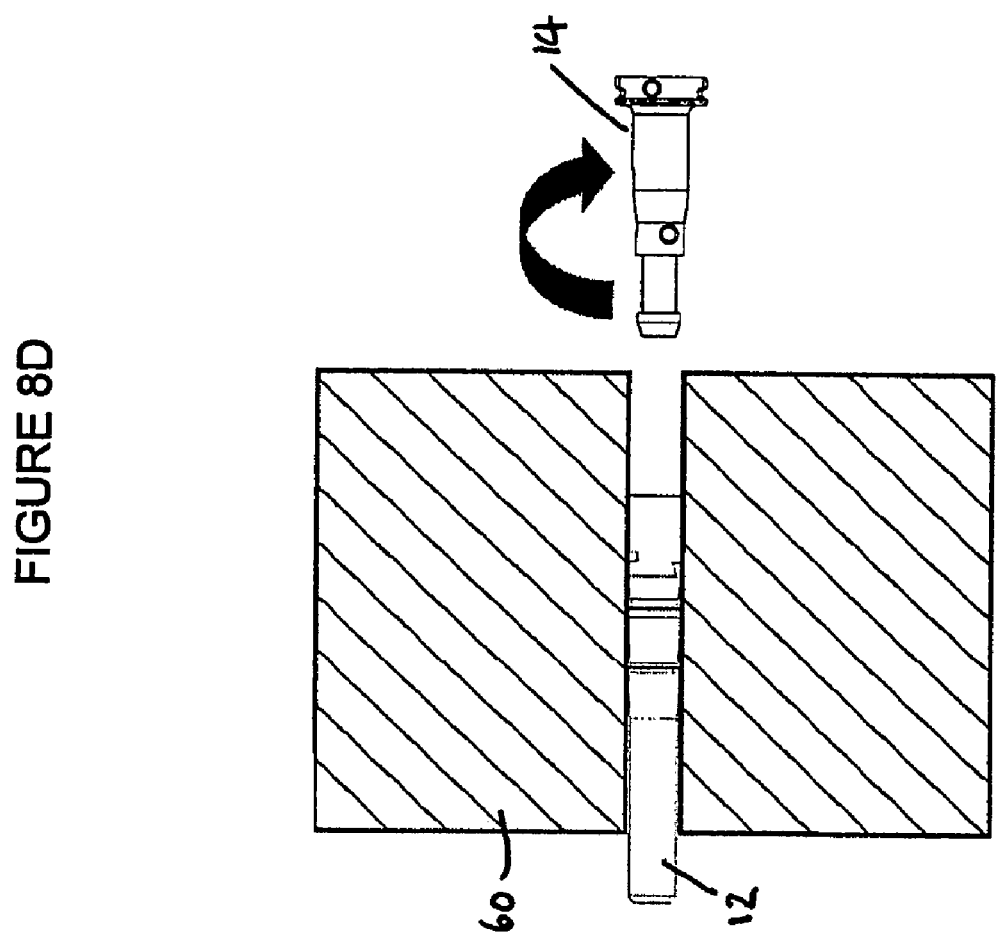

TELECOMMUNICATIONS LEAD-IN APPARATUS

This application is the US national phase of international application PCT/GB2004/004183, filed 30 Sep. 2004, which designated the U.S. and claims priority of GB 0322893.9, filed 30 Sep. 2003, the entire contents of each of which are hereby incorporated by reference.

BACKGROUND

1. Technical Field

This invention relates to apparatus and a method to control and guide telecommunications cables such as optical fibre cables, and is of particular relevance to the manner in which optical fibres are led into buildings at customer entry points, to connect the premises to the external trunk network.

2. Related Art

The telecommunications network at present comprises a trunk network substantially constituted of optical fibre, and local access networks constituted of copper wire pairs. It is expected that in the future the entire network, including the access network, will be constituted by fibre. It is known, however, that the properties of optical cable and copper wire are quite different, as discussed below, so that cable runs, building entry methods and network termination equipment for fibre and copper are different. This means that upgrading an installation from copper to optical fibre is expensive and cannot be easily achieved, as the infrastructure would generally have to be completely replaced.

The preferred method of installing optical fibre from the trunk network to customers' premises is by the blowing-in method (as originally described in EP 0108590). Blown fibre tubes are first fed along the outer wall of a customer's premises and then turned through 90 degrees, to pass through a bore made in the wall of the premises to enter therein. Optical fibre is subsequently to be blown into the tubes.

For the avoidance of doubt, the term "customers' premises" in this description includes all buildings into which telecommunications cables such as optical fibres are to enter. "Cable" shall be understood to refer to copper pairs, optical fibre, blown fibre, blown fibre tubes or other telecommunications cable, as the context permits.

A problem lies in one of the differences between copper pairs and optical fibre. Unlike copper, optical loss occurs at the sites of optical fibre bends or curves. Sharp bends can cause significant optical loss as well as mechanical failure. The tighter the bend, the worse the loss (source: John Crisp "Introduction to Fiber Optics" 2001 edition, page 53). Although fibre can be bent in use, excessive bending would result in fibre damage and/or significant optical losses. The limit beyond which the cable should not be bent as this would result in unacceptable radiation loss is known as the minimum bend radius (source: American National Standard for Telecommunications Telecom Glossary 2000).

A bare optical fibre comprising just the core, cladding and primary buffer has a minimum permissible bend radius typically of about 50 mm. A fibre cable including its outer protective layers, and bundles of optical fibre have even greater minimum permissible bend radius. Thus, even a single optical fibre cannot be bent directly through 90 degrees to go around corners. The need to respect the minimum bend radius requirement means that even a single fibre will protrude significantly at the site of the bend, e.g. where it enters an access bore in the wall of a customer's premises, and similarly will protrude as it exits the bore on the other side of the wall. (For ease of description, references henceforth to "entry" and the like of cables into bores shall include "exit" and vice versa, where the context permits.)

One known method to deal with this problem posed by the minimum permissible bend radius of the fibre as it exits the access bore, is to allow at least one loop of fibre to be fixed to the wall proximate to the access bore where the fibre exits. A relatively large customer lead in housing (CLI) unit is used to house the loop(s) of fibre, to protect it against interference and damage. The radius of the exiting fibre is generally not controlled within such a CLI unit.

An improvement which reduces the size of such a CLI housing unit is described in EP 0748460. This CLI unit is further described below against FIG. 1, but it essentially involves controlling the path of the exiting cable, to reduce the fibre's radius to substantially its minimum, while guarding against fibre breakage or loss.

BRIEF SUMMARY

The present invention slims the bulk of the lead in device even further, by reducing the projection of the exiting optical fibre from the bore. The smallness of the lead in device of the invention allows it to be used in conjunction with other components to add further functionality. The invention further permits the lead in device to be used for both copper wire as well as for optical fibre, with the significant result that a copper system can be upgraded without having to discard and replace these components once installed into the building fabric.

In a first aspect, the invention provides a cable lead out device suitable for use within a bore through a wall, the device comprising a body to guide a cable, the cable having a minimum permitted bend radius, along a passageway in the bore, the passageway being defined by the body and extending in an arc from a first point within the bore via the mouth of the bore to a second point outside the bore, wherein the first point is sited within the bore at a location at or proximate to the surface of the bore, so that the cable guided along the passageway arcs at not less than its minimum permitted bend radius.

In a second aspect, the invention provides a cable lead out device positioned within a bore in a wall, the device comprising a body to guide a cable, the cable having a minimum permitted bend radius, along a passageway in the bore, the passageway being defined by the body and extending in an arc from a first point within the bore via the mouth of the bore to a second point outside of the bore, wherein the first point is sited within the bore at a location so that the cable guided along the passageway arcs substantially at its minimum permitted bend radius.

In a further aspect, the invention provides a cable lead out device for location within a bore in a surface, for guiding a cable having a minimum permitted bend radius from the bore, the device having a body for location within the bore, the body defining a passageway to accommodate the cable, the passageway extending in an arc from a first point within the bore at which the passageway has a longitudinal axis which is parallel with the longitudinal axis of the bore via a second point outside the bore, the longitudinal axis of the passageway at the second point being orthogonal or substantially orthogonal to that at the first point, to an exit outside the bore whereat the cable emerges from the device, the location of the first point being sufficiently far inside the bore that in use neither the device nor the cable where it emerges from the exit protrudes from the surface by more than minimum permitted bend radius of the cable.

BRIEF DESCRIPTION OF THE DRAWINGS

Embodiments of the invention will now be described by way of example only with reference to the accompanying drawings in which:

FIG. 2 is a longitudinal cross section view of the lead in device according to an embodiment of the invention.

FIG. 3A shows the unassembled horn portion while FIGS. 3B and 3C show the horn portion when assembled.

FIGS. 8A to 8D show steps in the installation of the lead in device.

DETAILED DESCRIPTION OF EXEMPLARY EMBODIMENTS

Figure 1A:
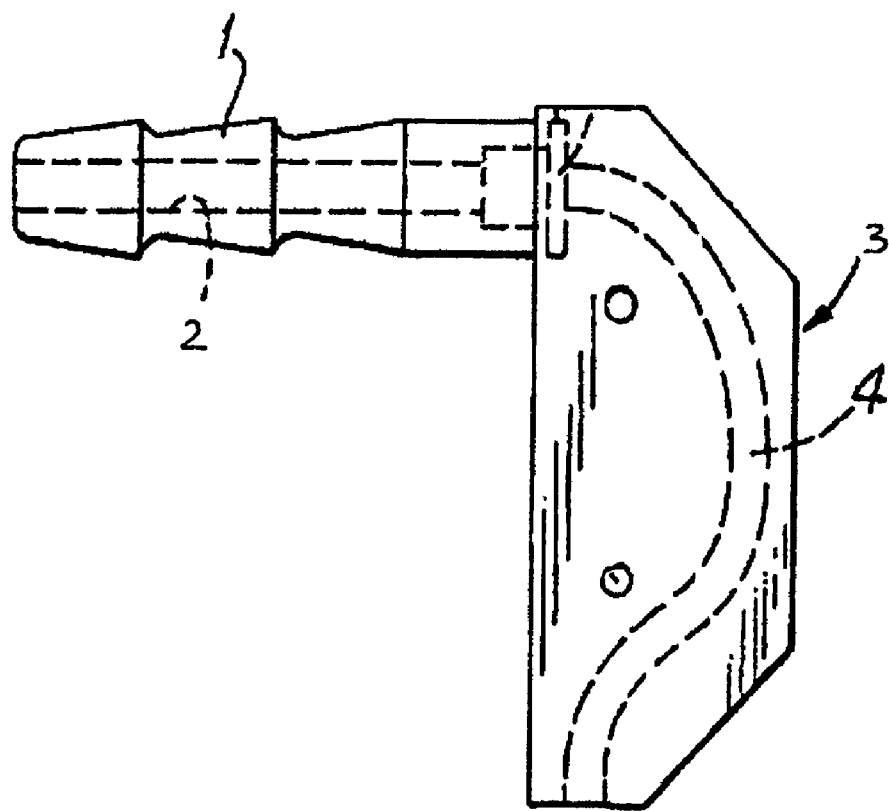
FIG. 1A is a view of the customer lead in unit of the prior art.

FIG. 1 depicts the prior art customer lead in (CLI) unit of EP 0748460. FIG. 1A shows that this prior art unit has two parts: a lead in device including a plug (1) with a hollow axial bore (2) of a diameter suitable to accommodate a cable, engageable with a separate complementary section (3), which is similarly bored (4). When engaged the bores of the lead in device and the complementary section align to allow the passage of the cable or optical fibre through the CLI unit. The complementary section acts to receive the optical fibre as the latter exits from the mouth of the lead in device. The bore (4) within the complementary section is arranged to guide and control the path taken by the optical fibre. The curve is calculated to keep the radius of the path of the optical fibre at or near (e.g. just above) the minimum bend radius.

Figure 1B:
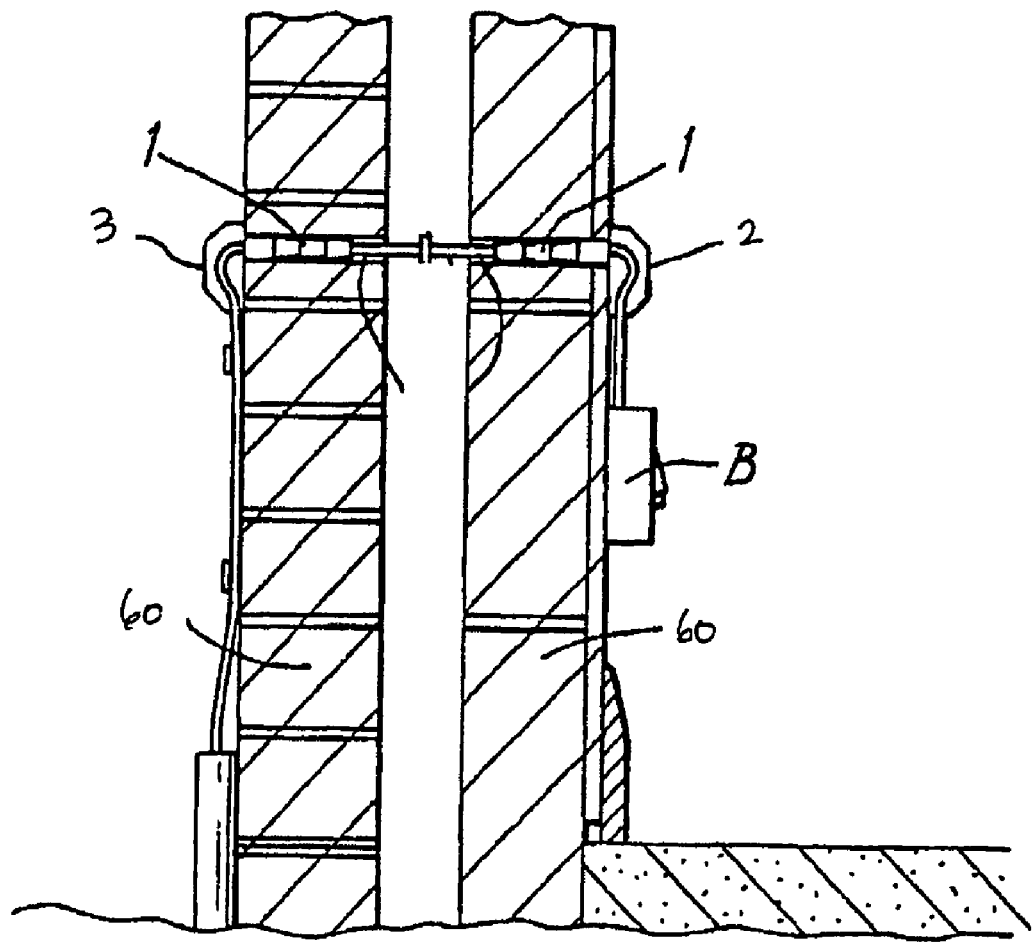
FIG. 1B is a view of the customer lead in unit of the prior art when installed.

FIG. 1B shows the prior art CLI unit in use. The plug (1) is engaged, frictionally or otherwise, with the access bore in the customer's wall (60), so that the mouth (2) of the plug is substantially flush with the mouth of the access bore. The complementary section (3) acts to receive the optical fibre as the latter exits from the access bore. The path of the bore in the complementary section curves through 90 degrees following a radius suitable to accommodate the minimum bend radius of an optical fibre entering or emerging from the wall, thus managing the path of the fibre as it passes through. This allows the CLI unit to reduce fibre protrusion.

FIG. 2 shows an embodiment of the present invention, which reduces the protrusion of the cable further. The lead in device (10) comprises two parts, a tube portion (12) and a horn portion (14).

The horn portion push-fits with the tube section as shown, and in a preferred embodiment, the parts are rotatable relative to each other when assembled, perpendicular to its axis. The tube portion includes a bore (13) along its length, sized to receive a cable. The horn portion has a similar bore (15), which upon being fitted to the tube portion, forms a continuous path along the length of the lead in device to allow a cable to pass therethrough. The bore for the most part runs in a straight path. A section of the horn portion (14) however, is arranged so that the section of the bore leading out to the terminating end of the lead in device (16) is curved as shown in the drawing.

The horn and tube sections will now be discussed in greater detail.

Figure 3C:
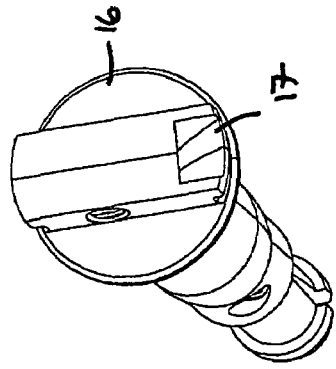
FIGS. 3A-C are views of the horn portion of the lead in device.
Figure 3A:
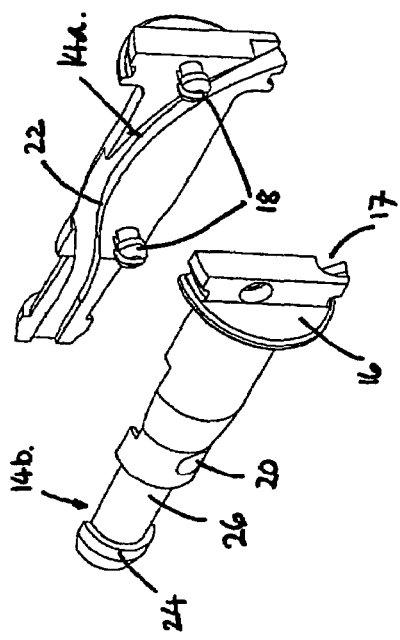

FIG. 3 shows three views-of an embodiment of the horn portion (14) of the lead in device (10). FIG. 3A shows a preferred embodiment of the horn portion which comprises two parts (14a, 14b), which are connected together by co-operating male and female portions on the two parts. In the example shown, the male portions (18) are all provided on one piece (14a) of the horn portion and all the mating female (20) portions are on the other piece (14b). This drawing also shows how the internal wall of horn portion of one piece (14a) is profiled (22) to create a curved bore path (15) leading out to the terminating end (16). The other piece (14b) is similarly internally profiled so that when fitted together, the internal walls define the bore running through the horn portion. The terminating end includes an aperture (17) through which the cable exits the lead in device. The end opposite to the terminating end is the engaging end (24), fits with the tube portion when the lead in device is fully assembled. The engaging end is mounted on a neck (26). This arrangement allows the engaging end to securely "snap-fit" when pushed into the complementary part of the tube portion. In addition, the horn and the co-operating part of the tube portion are configured to be rotatable with respect to each other, after assembly. This allows a user to select which direction he would like the exiting cable to proceed in, after it exits through the aperture.

Figure 3B:
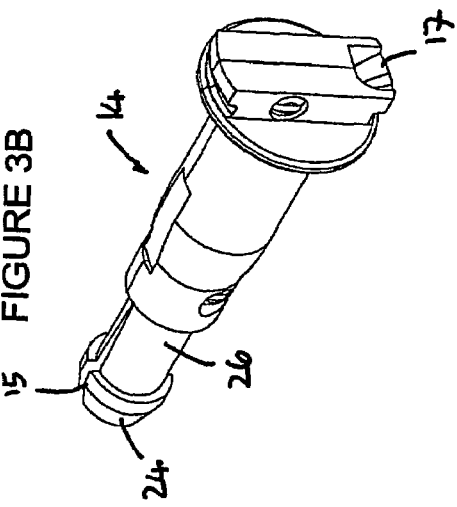

FIG. 3B shows the two pieces (14a, 14b) fitted together making up the assembled horn portion (14). It can be seen from this drawing that the neck (26) is split along the horn portion's axis so that the engaging end (24) comprises two sections spaced apart by gaps, one of which is indicated at (15). This preferred arrangement eases the user's task to push the horn portion to "snap-fit" the engaging end to the tube portion. Referring back to FIG. 2, the cross-section of the horn portion (14) depicts the path taken by the bore (15), as well as how the engaging end (24) and the neck (26) fit into the tube portion (12).

FIG. 3C shows another view of the assembled horn portion (14). After the whole lead in device is installed, the terminating end (16) is the only part substantially visible outside the wall. The aperture (17) through which the cable exits is clearly shown in this drawing.

A main function of the horn portion is to divert the path of the cable to follow the prescribed curve before it exits the bore in the wall. Accordingly any means to achieve that end could be used. For example the horn portion bore could, instead of being curved, be straight but include diverting means which could take the form of a nub or bump on the internal wall to influence the path taken by the cable. In such an arrangement, room within the horn portion to accommodate the diverted cable path must be allowed, so that the cable is guided along the curve, rather than confined within the path of the bore. Moreover, care needs to be taken when designing such a structure for an optical transmission medium to avoid creating microbends which also affect optical signal quality.

The curve defined by the bore path is pre-determined according to the type of cable used and with the aim of reducing cable projection. Further details about this aspect of the invention are provided in connection with FIGS. 5 and 6 below.

Figure 4:
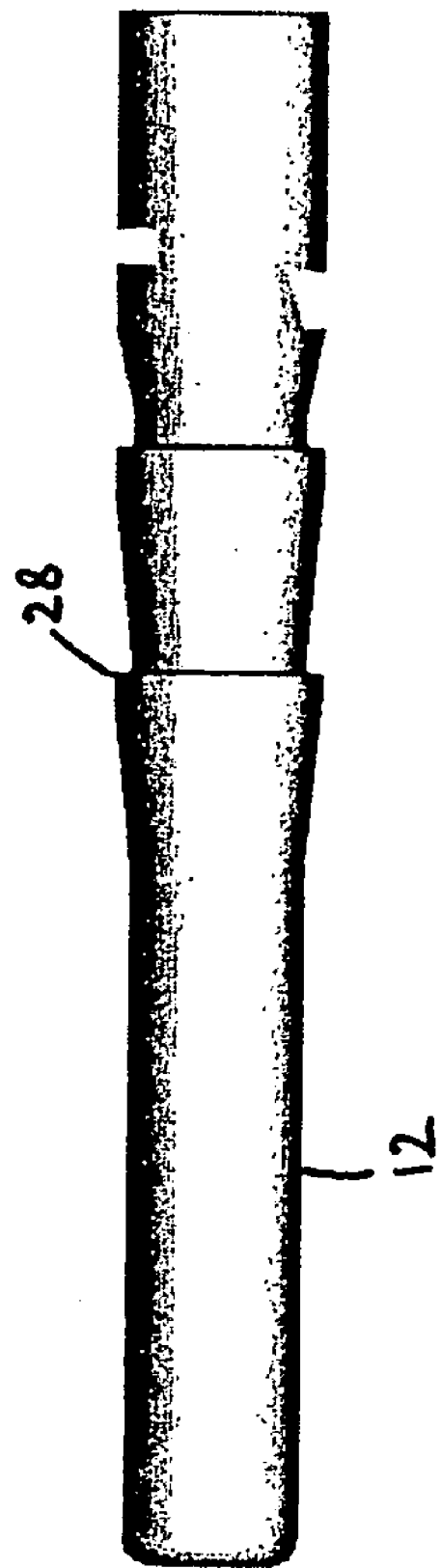
FIG. 4 is a view of the tube portion of the lead in device.

FIG. 4 depicts the exterior of the tube portion (12) of the lead in device. In this embodiment, this comprises a straight tube, which is preferably externally profiled with one or more flanges (28). Referring back to FIG. 2, the flanges help to reduce friction when it is inserted into a pre-drilled bore (50) in the customer premises wall (60), as well as to prevent movement after the plug has been put into position. It can also be seen from FIG. 2 how the internal wall of the tube portion engages with the engaging end (24) and neck (26) of the horn portion (14).

The lead in device can be used not only for optical fibre, but also for conventional twisted wire pairs, as it would work equally well to guide the copper wire through the customer premises wall. There is thus a considerable advantage in adopting this device for use even for copper wire as it means that expected upgrades from copper to fibre will obviate the need to remove all the infrastructure for copper wires to replace with plant for optical fibre.

The working of the invention will now be discussed in detail. In use, a customer or user would want to direct the cable (30) after it exits the bore to lie along the wall surface (70) in a preferred direction for termination or connection purposes. There will thus be a preferred cable exit direction.

Figure 5:
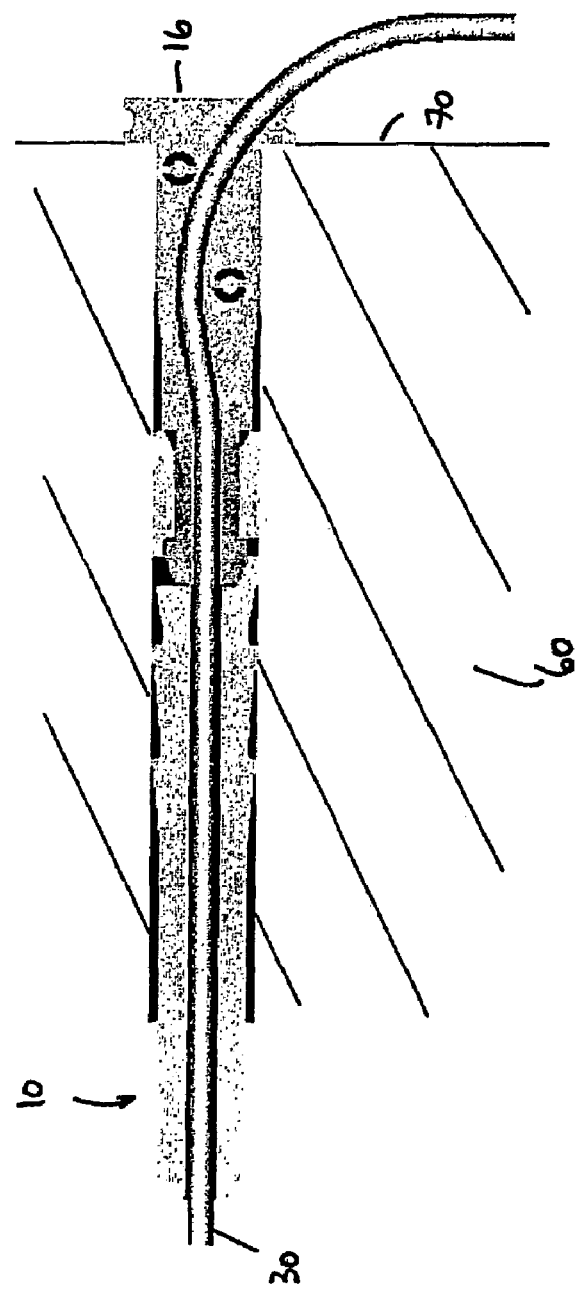
FIG. 5 is a cross section view of the lead in device in use with a cable routed through it.

FIG. 5 shows a longitudinal cross-section of the lead in device (10) in use in the wall (60) with a cable (30) routed through it, exiting in a downwards direction from the lead in device's terminating end (16).

The curved path of the cable is dictated by the bore as shown. In the example shown in FIG. 5, the preferred cable exit direction is downwards. Viewing the lead in device (10) in the direction towards its terminating end (16), the bore path starts to bend away from its path along the central axis of the bore in a direction opposite to the preferred cable exit direction, in this case, upwards. The bore path then changes direction and curves in the preferred cable exit direction as the cable is guided outwards towards the wall surface (70), i.e. downwards in this example. By commencing the bend of the cable before it exits the lead in device, the extent of projection from the wall is reduced, as further detailed in connection with FIG. 6 below.

Figure 6:
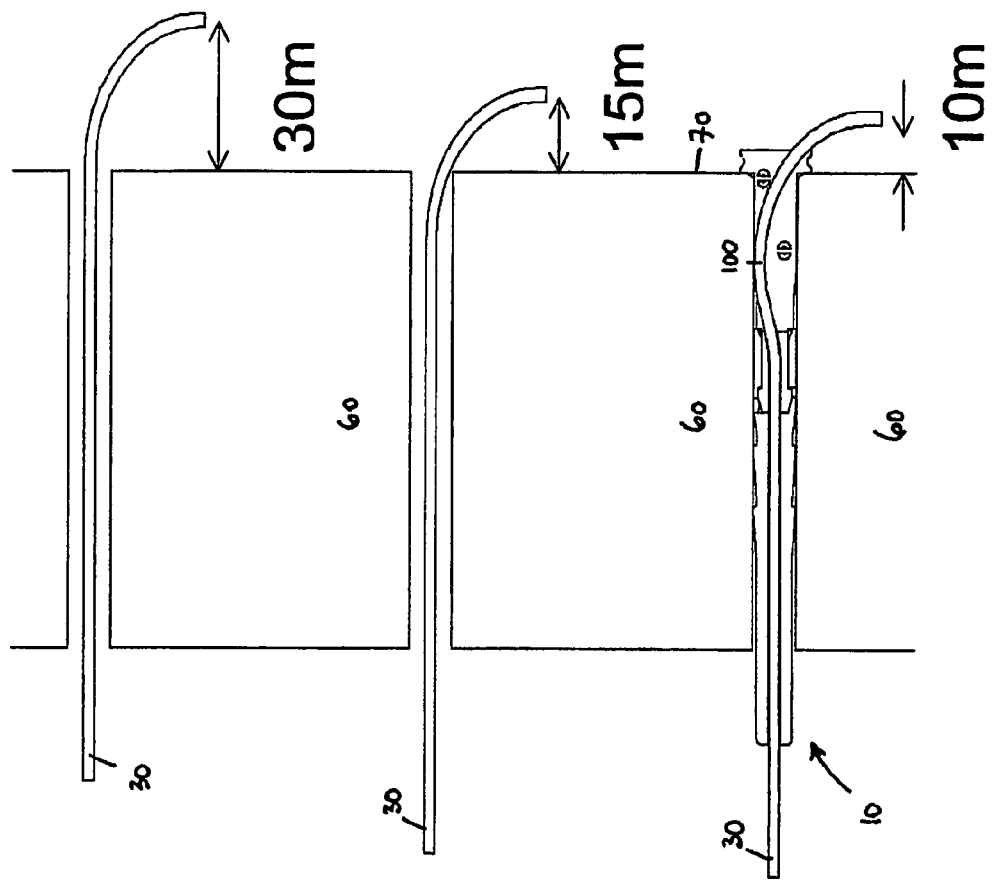
FIG. 6 illustrates of the principle of the internal bend initiation in the lead in device; examples illustrate how a cable may behave with and without bend control upon exit from a bore.

FIG. 6 shows examples of optical fibre cable (30) projection from a bore (50) in the wall (60) in three different situations. These examples are based on an assumption of a typical bore radius of 12 mm. FIG. 6 at the top illustrates the extent of cable projection in the case where there is no cable bend control—so the bend radius here is entirely reliant on the cable's own stiffness and weight. Bend control takes place solely after the cable exited the bore, on the wall surface (70). In such a case, cable protrusion of about 30 mm can be expected. FIG. 6 at the middle shows the tighter exiting cable radius taken where positive bend control is applied on the cable as it exits the bore, for example when a device of the prior art described in connection with FIG. 1 is used. The extent of protrusion is reduced, to around 15 mm. FIG. 6 at the bottom shows how the bend radius can be even further reduced if the cable is guided along a curve before it exits the bore, according to the technique of the present invention. Unlike cables in FIG. 6, the cable path does not travel solely along the central axis of the bore. Instead it initially curves in a direction opposite to the preferred cable exit direction, to allow the cable the full extent of space to curve back in the preferred cable exit direction. This has the effect of essentially pushing back the curve of the cable into the bore of the wall. Cable protrusion outside the wall is as a result is reduced to about 10 mm.

It will be noted that the invention lies chiefly in the arrangement within the bore so that the cable is made to run through a specific path prior to its exiting the bore. In particular, the advantage of the invention can be achieved if the cable path runs through a specific point within the bore. In a preferred embodiment, this point is located on the inner surface of the bore, and its position along the axis of the bore is determined by the minimum bend radius of the particular cable in use. This point is identified as point (100) in the bottom-most drawing in FIG. 6. This would have the effect of minimising bend radius upon the cable's exit from the bore. Of course, the cable path need not run through this particular point within the bore as long as the cable path runs through a point proximate thereto, as moving the cable's bend into the bore to any extent will reduce protrusion from the wall.

Accordingly, although the embodiment discussed herein refers to an arrangement of a curved bore through a tube, the advantage of the inventive concept could be realised by other means. This includes any means to fix the cable within the bore to make it run through point (100), such as a wire contraption fitted within the bore of the wall to simply prop the cable up and against the inner surface of the bore.

There are many advantages to the reduction of fibre protrusion. A smaller, more streamlined CLI unit on the customer's wall would be less prone to accidental damage. The improved aesthetic appearance is also important, especially in domestic customers' premises at the entry point on the internal wall.

Reduced fibre protrusion additionally allows the lead in device to accept complementary components, which can be mounted on the wall at or near the point where the cable exits from the bore in the wall. These complementary units add functionality without excessive bulk—and which in particular can do more than merely guide the bend of the optical fibre. This aspect of the invention is further discussed below in connection with FIGS. 9 and 10.

Figure 7:
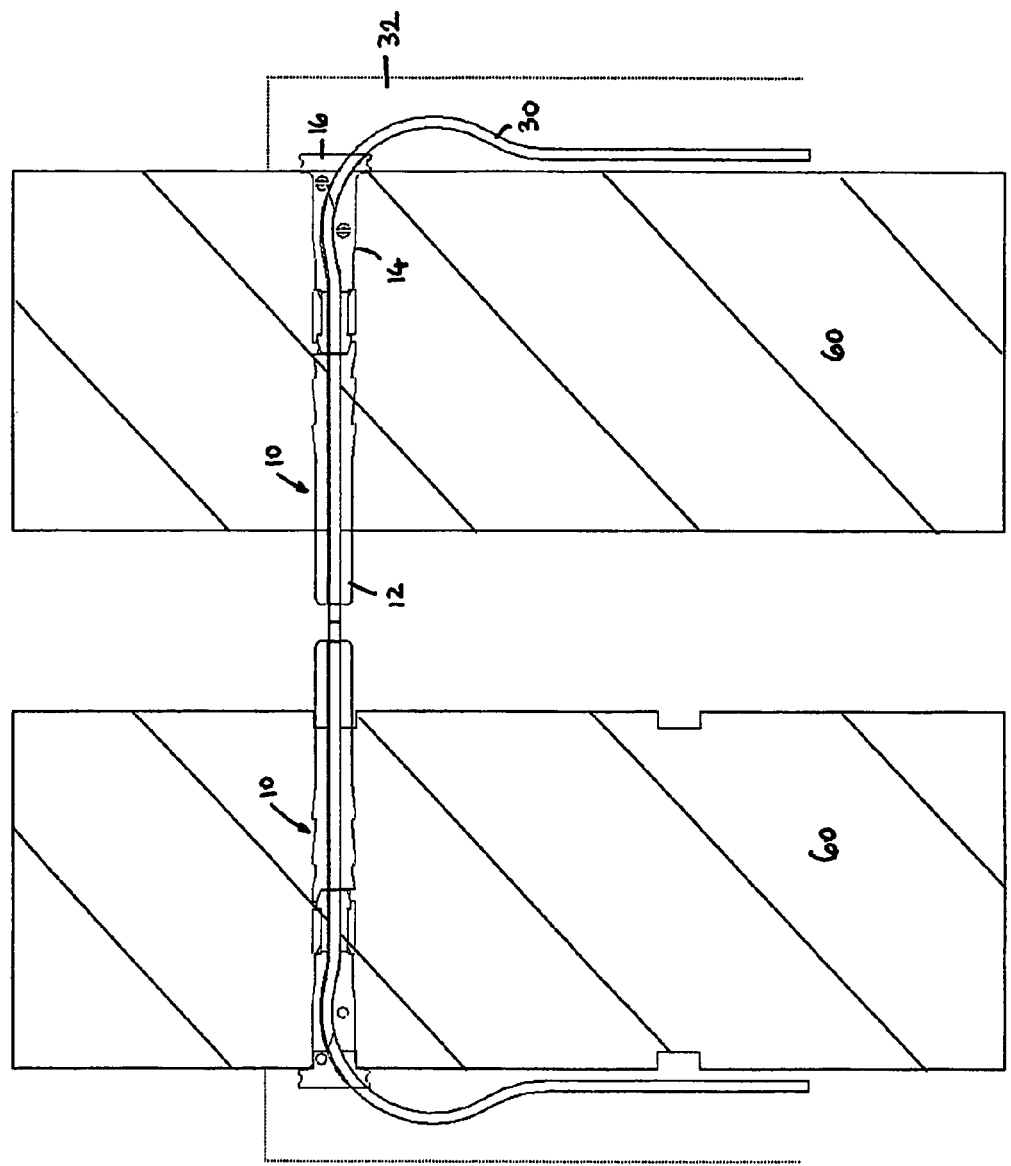
FIG. 7 is an illustration of a pair of lead in devices in use.

FIG. 7 depicts a pair of lead in devices installed in a customer's wall (60). The invention is not restricted to work with any specific building material or style, and the present description uses a wall comprising two separate cavity walls enclosing a central cavity merely as an illustration. In a typical scenario in the UK, the bore diameter is expected to be in the order of about 12 mm, being easily created with readily-available power tools (e.g. a consumer, rather than an industrial, hammer drill with a conventional masonry bit). Where the wall (60) is made of brick and mortar, the bore is created by drilling a hole at the intersection of two runs of mortar— e.g. where the vertical and horizontal lines meet at the corner of a brick—as this requires less effort and minimises cosmetic damage to the wall surface. The bore has substantially parallel walls, and is substantially horizontal. In a two cavity wall situation, the bores in the two skins of the wall are created at substantially the same height opposite each other, as shown in FIG. 7.

The lead in devices (10) are inserted into the pre-drilled bores, and fixed thereto substantially by friction although other fixing means such as glue could be used in addition or in place thereof. The terminating ends (16) of each, plug are located proximate to, and face outwards from the bores towards the interior and exterior wall respectively. The cable (30) is protected and guided through the walls by the lead in devices, which then manage the start of the exit bend of the cable within the fabric of the wall. Projection upon exit is reduced so that the cable can be safely drawn through 90 degrees to lie flush, or substantially flush, against the surface of the wall at an earlier stage than can be achieved in the prior art.

Also indicated in this drawing in dotted outlines, are the places where complementary components (32) to be used with the lead in devices. These serve to receive the cable as it exits from the lead in device, and continues the task of managing the bend of the cable, which began within the curved bore within the wall, in the plug. In some cases, the complementary components could include added functionality: for example, the component could include a splice tray. The complementary components are further discussed below in connection with FIGS. 9 and 10.

Figure 8A:
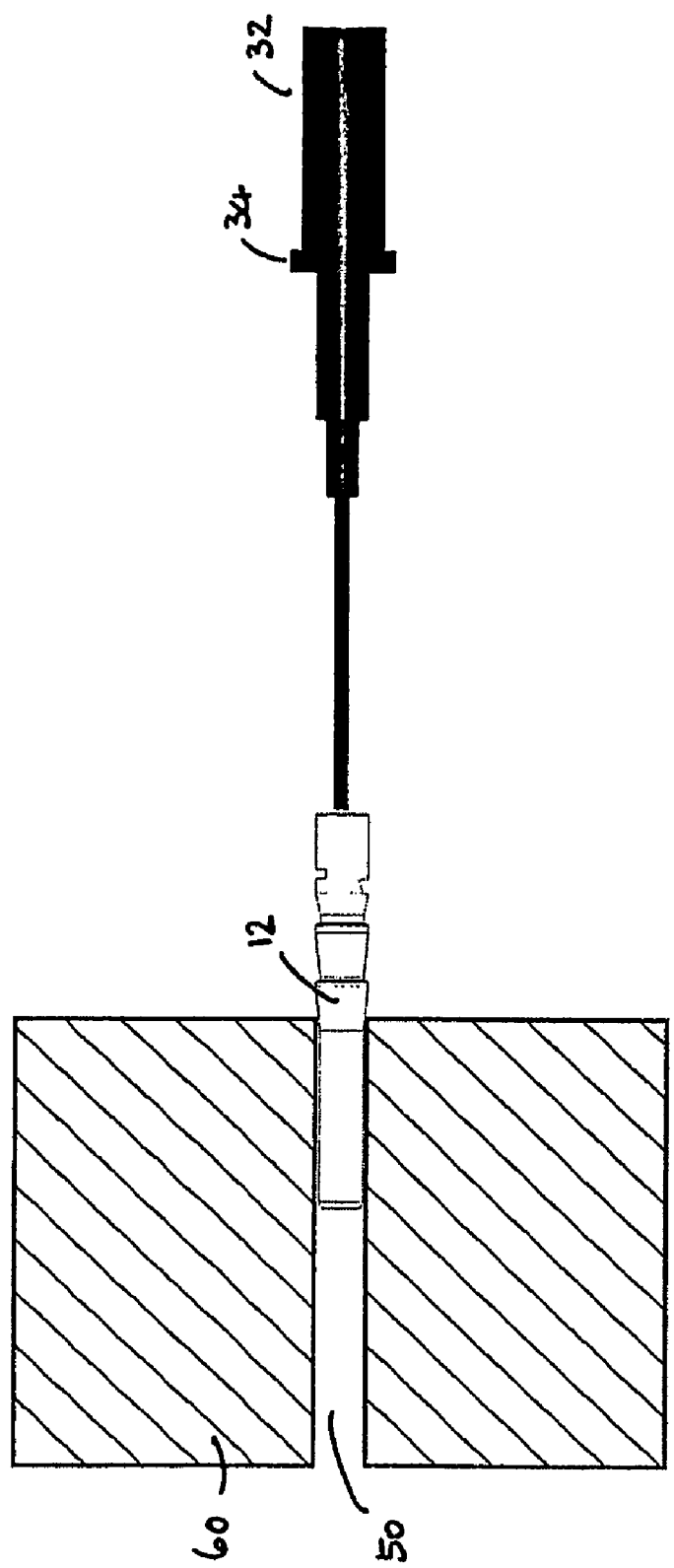
Figure 8B:
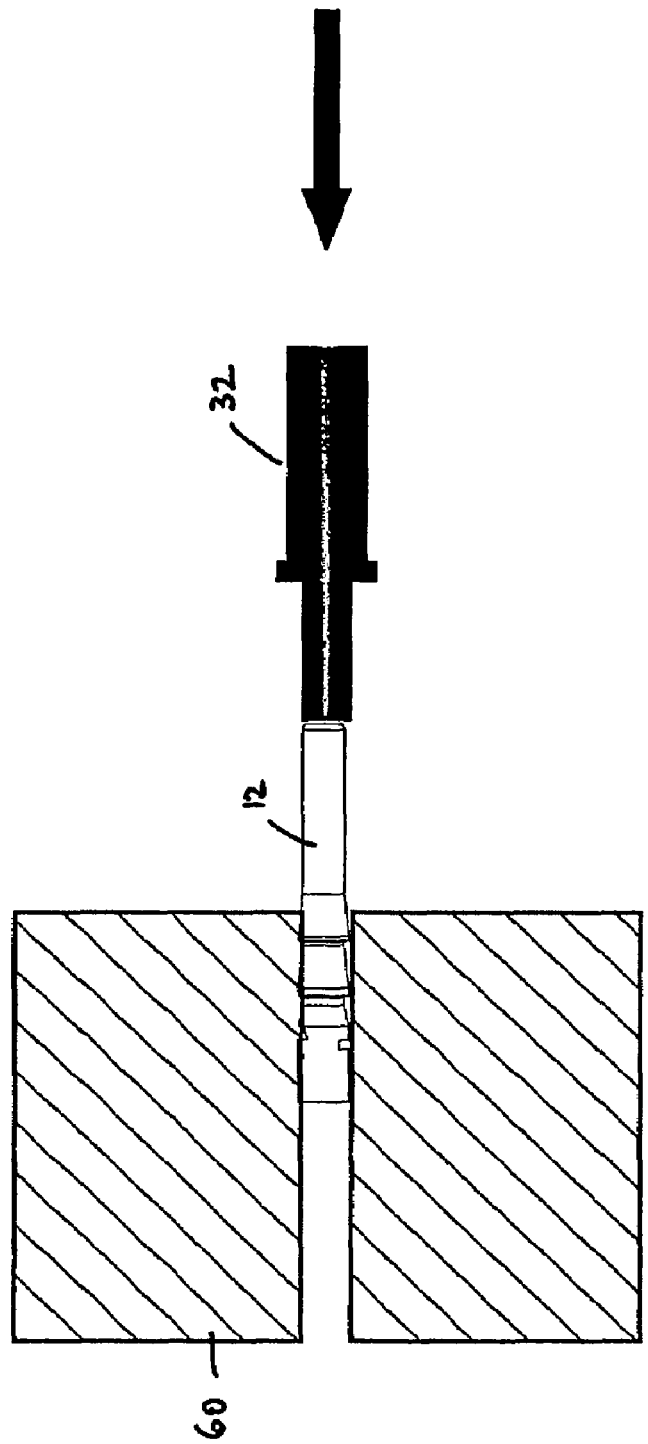
Figure 8C:
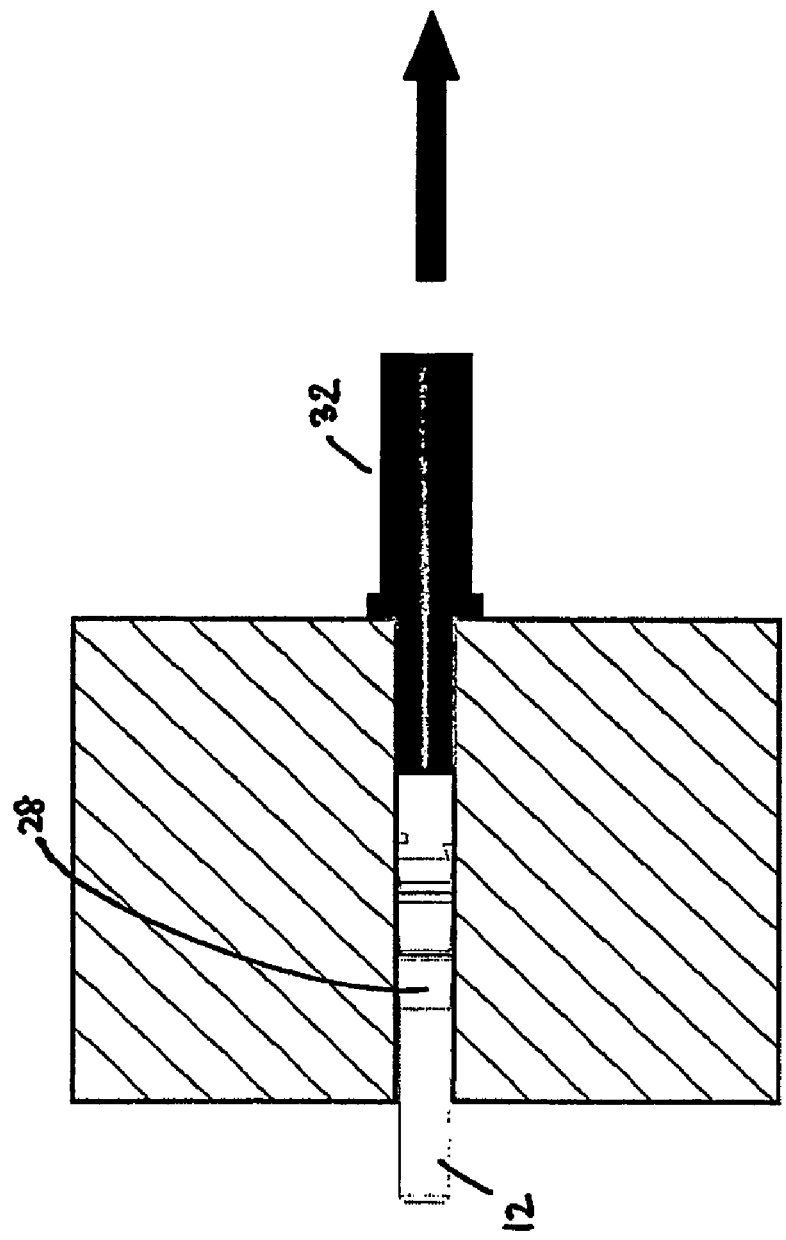

FIGS. 8A to 8D shows a method of installation of the lead in device. A bore (50) is drilled into the customer's premises wall (60), of a radius suitable to accept the lead in device. As shown in FIGS. 8A and 8B, the tube portion (12) is guided and push-forced in the direction of the arrow into the bore using an installation tool (32), which is specially designed for this purpose; the tool in particular includes an integral depth stop—in the form of a collar (34) to prevent the tube portion from being inserted too deeply into the bore. The installation tool is then withdrawn in the direction of the arrow as shown in FIG. 8C, and the flanges (28) of the tube portion help to frictionally hold its position within the bore. Subsequently, as depicted in FIG. 8D, the horn portion (14) is inserted and pushed to "snap-fit" with the tube portion. It is then orientated by rotating the horn portion relative to the tube portion depending on the preferred direction to be taken by the cable after it exits the bore—for example if it is intended for the cable to travel downwards along the wall surface, then the horn portion is rotated to guide the exiting cable in the appropriate direction.

Figure 9A:
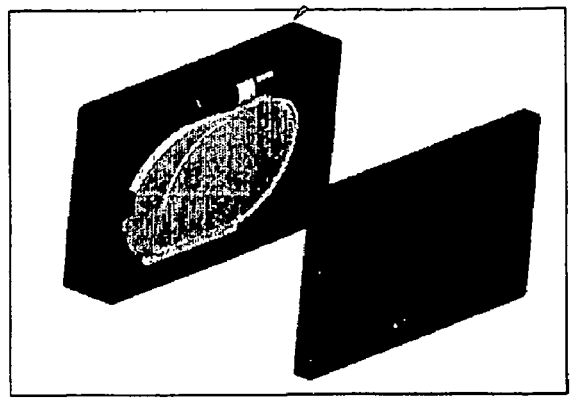
FIGS. 9A to 9F depict complementary components that can be used in conjunction with the lead in device.
Figure 9B:
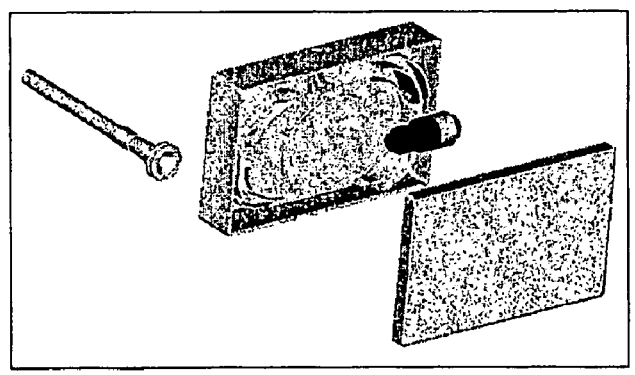
Figure 9C:
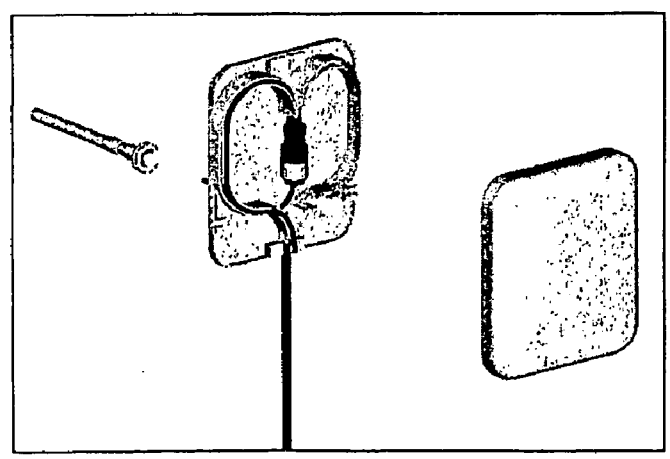
Figure 9D:
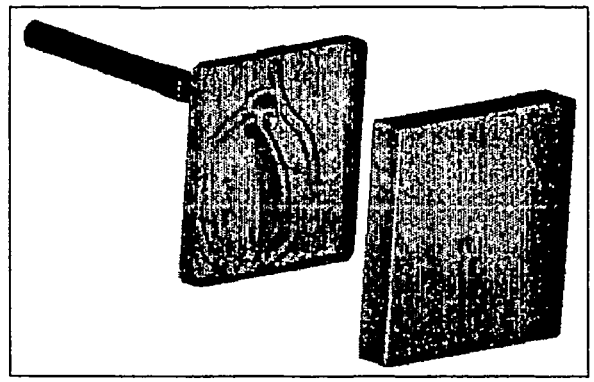
Figure 9E:
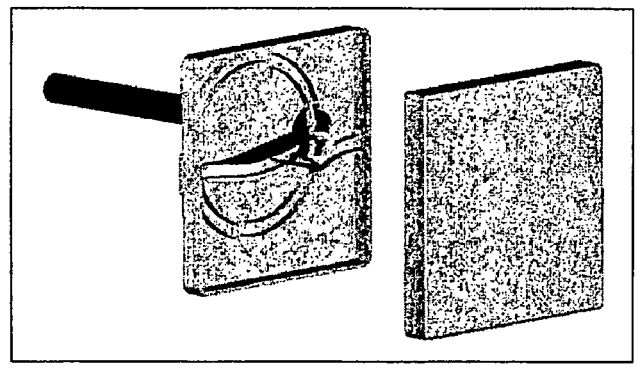
Figure 9F:
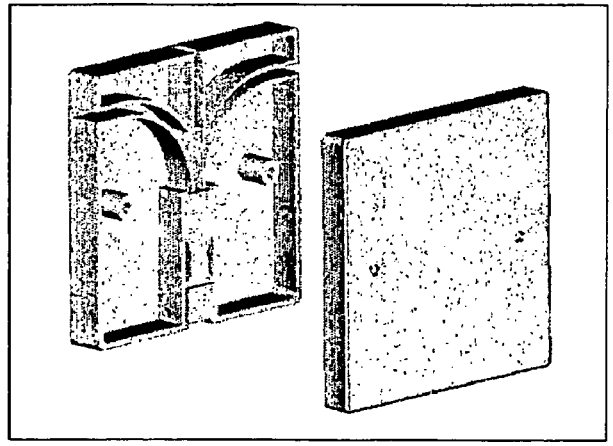
Figure 10A:
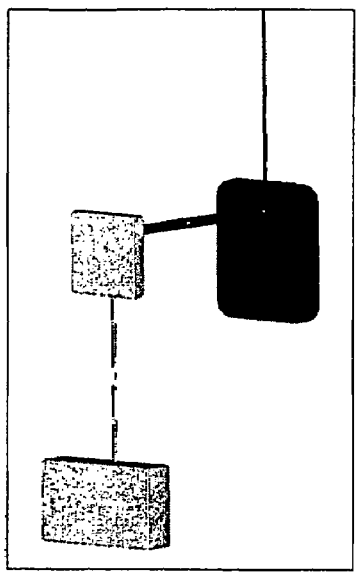
FIGS. 10A to 10L depict complementary components can be used with the lead in device in different installation scenarios.

FIG. 9 shows the various types of complementary components developed for use with the lead in device in the different methods available to provide a cable to customer premises. It will be realised that the complementary components discussed here are merely examples of what could be used in conjunction with the lead in devices and is thus not a complete product portfolio. The British Standards for Electric Accessories have been used as a basis for the designs described in FIG. 9 and below; modifications to them could and/or would be required for use of these designs in other markets. As discussed above, the components serve to continue the management of bend radius of the exiting cable and/or added functionalities as described:

FIG. 9A shows an External Fibre Splicing Point, which incorporates the following functions/features:
  Gas blocking of tube and blown fibre unit
  Cable butt termination
  Cable breakout
  Provision for housing optical splice tray
  Provision for housing network termination equipment (powered from inside premises)
  Locates over the lead in device
  IP55 rating FIG. 9B shows an Internal Fibre Splicing Point, which incorporates the following functions/features:
  Gas blocking tube and blown fibre unit, if required
  Cable butt termination
  Cable breakout
  Splice tray
  Locates over the lead in device FIG. 9C shows an External Fibre Ready Cable Entry Point with Gas Block, which incorporates the following functions:
  Cable/tube entry from all sides
  Gas blocking of tube and blown fibre unit
  Bend management
  Water drip
  Locates over the lead in device FIG. 9D shows an External Fibre Ready Cable Entry Point with no Gas Block, which incorporates the following functions/features:
  Cable/tube entry from all sides, by reorientation
  Bend management
  Water drip
  Locates over the lead in device FIG. 9E shows an Internal Fibre Ready Cable Entry Point is for use in remote network termination point applications. Its functions/features include:
  Cable/tube entry from all sides, by reorientation
  Bend management
  Locates over the lead in device FIG. 9F shows an Optical/Copper Network Termination Point for remote entry. Its functions/features include:
  Surface mounted
  Cable entry on three sides
  Cable exit on the fourth side
  Can be orientated to suit required cable exit direction FIG. 10 describes some typical installation scenarios illustrating how the complementary components, used with the lead in device may be configured to provide a cable to customer premises:

FIG. 10A shows an installation with overhead or underground feed; building entry, remote internal splicing point with connectorised tail.

Figure 10B:
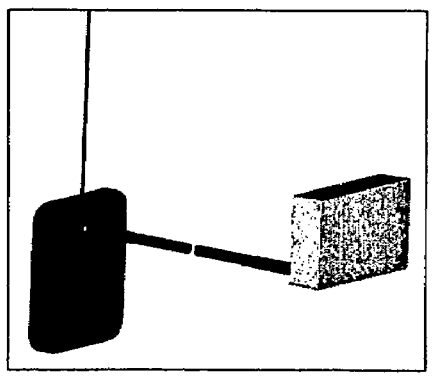

FIG. 10B shows an installation with overhead or underground feed; building entry, direct internal splicing point with connectorised tail.

Figure 10C:
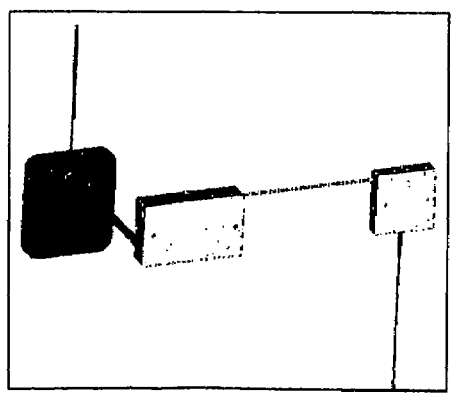

FIG. 10C shows an installation with overhead or underground feed; building entry, direct internal splicing point with remote network termination point.

Figure 10D:
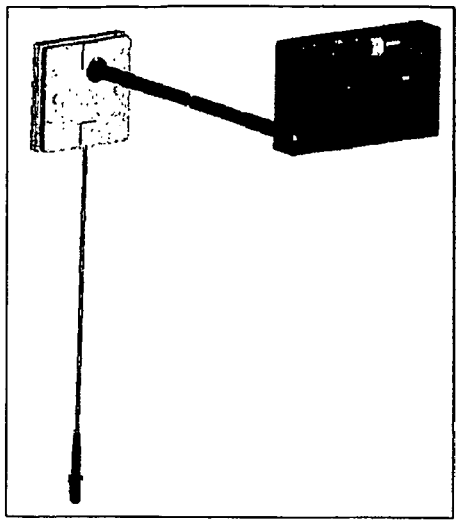

FIG. 10D shows an installation with overhead or underground feed; remote external splice, building entry with connectorised tail.

Figure 10E:
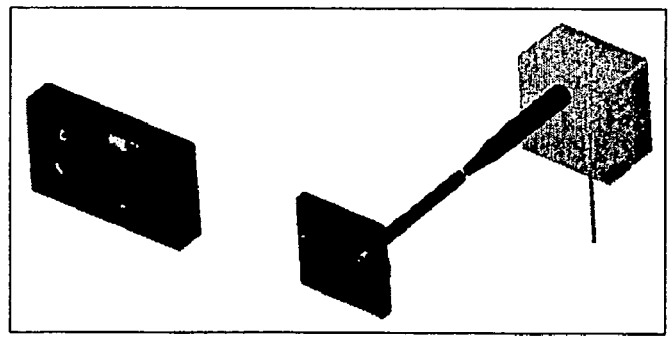

FIG. 10E shows an installation with overhead or underground feed; remote external splice, building entry with direct network termination point.

Figure 10F:
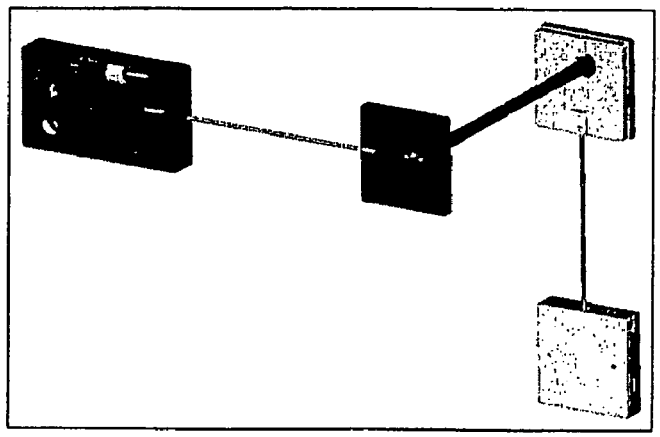

FIG. 10F shows an installation with overhead or underground feed; remote external splice, building entry with remote network termination point.

Figure 10G:
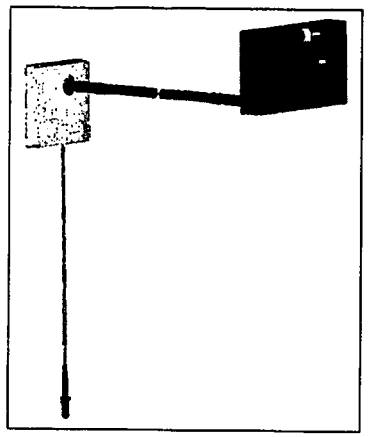

FIG. 10G shows an installation with overhead or underground feed; combined external splice & building entry with connectorised tail.

Figure 10H:
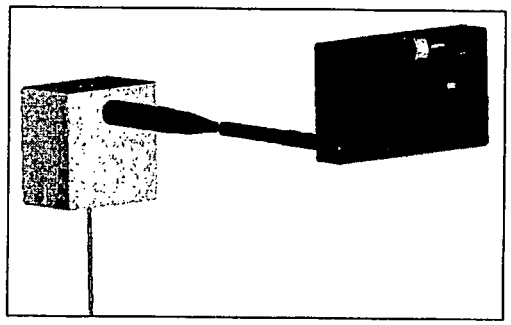

FIG. 10H shows an installation with overhead or underground feed; combined external splice & building entry with direct network termination point.

Figure 10I:
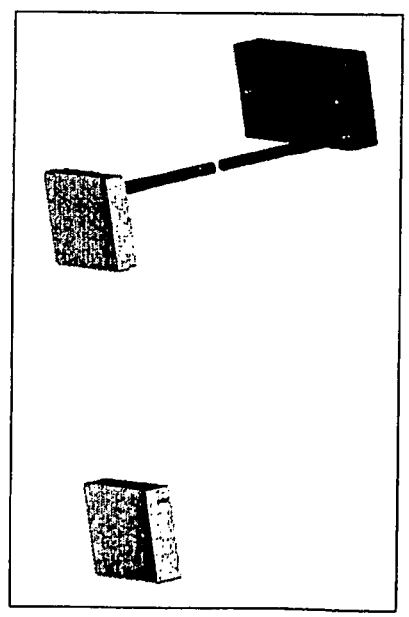

FIG. 10I shows an installation with overhead or underground feed; combined external splice & building entry with remote network termination point.

Figure 10J:
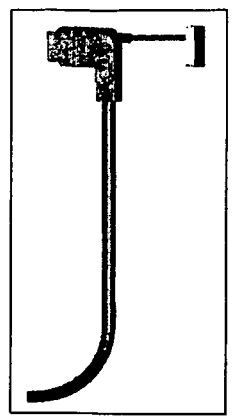

FIG. 10J shows an installation with overhead or underground feed; integral splicing point & building entry with connectorised tail.

Figure 10K:
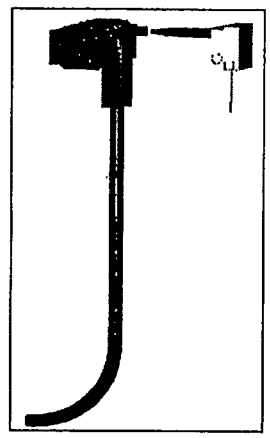

FIG. 10K shows an installation with overhead or underground feed; integral splicing point & building entry with direct network termination point.

Figure 10L:
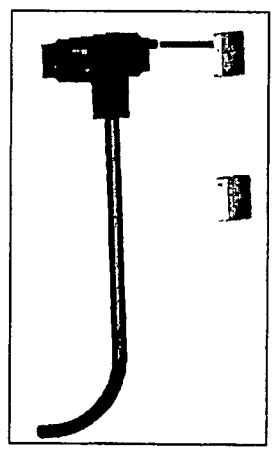

FIG. 10L shows an installation with overhead or underground feed; integral splicing point & building entry with remote network termination point.

The configurations as described above and in the drawings are for ease of description only and not meant to restrict the use of the lead in device and complementary components to particular arrangements, in use. The skilled person will realise that various configurations and permutations on the methods and apparatus described are possible within the scope of this invention as disclosed.

What is claimed is:

1. A cable lead out device suitable for use within a bore through a wall, the device comprising:
   a body to guide a cable, the cable having a minimum permitted bend radius, along a passageway in the bore, the passageway being defined by the body and extending in an arc from a first point within the bore via the mouth of the bore to a second point outside the bore,
   wherein the first point is sited within the bore at a location at or proximate to the surface of the bore, so that the cable guided along the passageway arcs at not less than its minimum permitted bend radius;
   wherein the body comprises a hollow wallplug which in use lies substantially within the wall, the cable extends through the bore via the hollow of the wallplug;
   wherein the hollow of the wallplug defines the part of the passageway from the first point to the mouth of the bore; and
   wherein the wallplug comprises a first hollow tube which in use lies wholly within the wall, and a second hollow tube having two ends, which in use is positioned so that it engages at its first end with the first tube so that the hollow of the first tube communicates with the hollow of the second tube, and which second end is located at or proximate to the mouth of the bore.

2. A cable lead out device according to claim 1 wherein the hollow of the second tube defines the part of the passageway from the first point to the mouth of the bore.

3. A cable lead out device according to claim 1 wherein the first tube is rotatably engaged with the second tube at the first end of the second tube.

4. A cable lead out device according to claim 1 wherein the body includes flanges on its exterior surface.

5. A cable lead out device positioned within a bore in a wall, the device comprising a body to guide a cable, the cable having a minimum permitted bend radius, along a passageway in the bore, the passageway being defined by the body and extending in an arc from a first point within the bore via the mouth of the bore to a second point outside of the bore, wherein the first point is sited within the bore at a location so that the cable guided along the passageway arcs at not less than its minimum permitted bend radius.

6. A cable lead out device for location within a bore in a surface, for guiding a cable having a minimum permitted bend radius from the bore, the device having a body for location within the bore, the body defining a passageway to accommodate the cable, the passageway extending in an arc from a first point within the bore at which the passageway has a longitudinal axis which is parallel with the longitudinal axis of the bore via a second point outside the bore, the longitudinal axis of the passageway at the second point being orthogonal or substantially orthogonal to that at the first point, to an exit outside the bore whereat the cable emerges from the device, the location of the first point being sufficiently far inside the bore that in use neither the device nor the cable where it emerges from the exit protrudes from the surface by more than minimum permitted bend radius of the cable.

7. A cable lead out device for guiding a cable having a minimum permitted bend radius along a cable path through a wall, to exit the wall in a preferred cable exit direction, said device comprising:
   a body engageable with a bore extending through the wall, the body including diverting means for causing (a) a first section of the cable path to curve against the direction of the prefferred cable exit direction, and (b) a second section of the cable path to curve in the direction of the preferred cable exit direction, the first section and the second section of the cable path being located within the bore.

8. A cable lead out device according to claim 7, wherein:
   the body comprises a hollow wallplug which in use lies substantially within the wall, the cable path extending through the bore via the hollow of the wallplug, and
   the hollow of the wallplug defines the first section and second section of the cable path.

9. A cable lead out device according to claim 7 wherein the wallplug comprises a first hollow tube which in use lies wholly within the wall, and a second hollow tube having two ends, which in use is positioned so that it engages at its first end with the first tube so that the hollow of the first tube communicates with the hollow of the second tube, and which second end is located at or proximate to the exit of the bore.

10. A cable lead out device according to claim 9 wherein the hollow of the second tube defines the first section and the second section of the cable path.

11. A cable lead out device according to claim 9 wherein the first tube is rotably engaged with the second tube at the first end of the second tube.

12. A cable lead out device according to claim 8 wherein the body includes flanges on its exterior surface.

13. A method of guiding a cable having a minimum permitted bend radius along a cable path through a wall, to exit the wall in a preferred cable exit direction with reduced cable protusion, said method comprising:
   installing the cable through a bore extending through the wall causing a first section of the cable path to curve against the direction of the preferred cable exit direction; and
   causing a second section of the cable path to curve in the direction of the preferred cable exit direction;
   wherein the first section and the second section of the cable path are located within the bore.

* * * * *